3,153,331
AIRCRAFT AIR CONDITIONING SYSTEM
Brian Howard Rogers, Yeovil, Somerset, England, assignor to Normalair Limited, Yeovil, England
Filed Nov. 27, 1961, Ser. No. 155,211
Claims priority, application Great Britain Nov. 26, 1960
5 Claims. (Cl. 62—241)

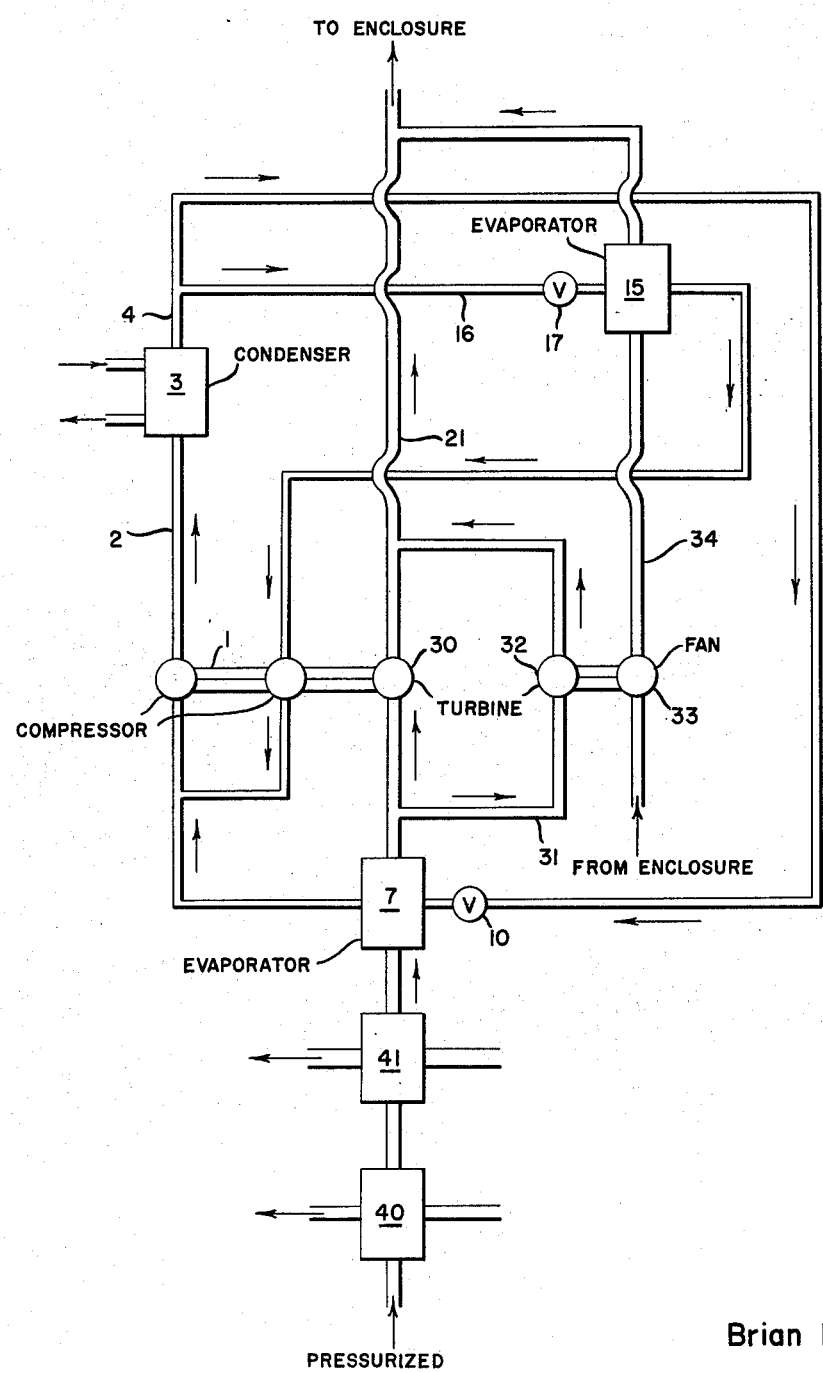

This invention relates to air conditioning systems for use, although not exclusively, in aircraft, and more particularly for aircraft of the high altitude type flying at supersonic speeds.

Known air conditioning systems for aircraft usually include a closed circuit vapor cycle cooling system using either ram air or fuel flow to cool the condenser. However, for aircraft flying at supersonic speeds, although ram air usually will provide the necessary cooling for the condenser, this is often undesirable as the power requirement of known systems will be excessive, and further the temperature of the refrigerant will be undesirably high and could lead to decomposition. Alternatively, the most suitable condensing medium available is fuel which, nevertheless, for supersonic aircraft may be well above the ram air temperature used in sub-sonic aircraft, and the power consumption and refrigerant temperature will still be excessive to a lesser degree.

It is with the above problem in mind that the following invention has been evolved, which has for its object to provide an air conditioning system for an aircraft of the supersonic type, including a closed circuit vapor cycle system, the evaporator or evaporators of which are adapted to operate at a higher temperature level than is usual in known systems. Consequently, the heat to be absorbed by the refrigerant fluid is less than in known systems, which permits hot fuel or ram air to be used as the condensing medium, and which results in a lower power requirement than has hitherto been encountered.

It is a further object of the invention to provide an air conditioning system for an aircraft of the supersonic type, wherein a sufficient quantity of fresh air is supplied to ventilate an enclosure of the aircraft, the flow of fresh air providing the power to recirculate some of the air from the enclosure and further providing power to drive the closed circuit vapor cycle system, which cools both the fresh air and recirculated air.

Accordingly, the invention relates to a closed circuit vapor cycle system for cooling an enclosure of an aircraft of the high speed, high altitude type, comprising a refrigerant compressor of the multi-stage type, a condenser, expansion valve means and first and second evaporator means, the fresh air which is cooled by passage over the first evaporator means driving a first turbine operatively connected to drive the compressor before discharge of the fresh air into the enclosure, a second turbine driven by a flow of the fresh air through a branch line and operable to drive a fan for recirculating air from the enclosure and passing same over the second evaporator means before discharge into the enclosure, the second evaporator means being connected to the inlet of the first stage of said compressor and the first evaporator means being connected to the inlet of a further stage of the compressor, whereby the pressure and temperature levels at which the first and second evaporator means operate are automatically controlled.

Further objects and advantages of the invention will become readily apparent from the following detailed description with reference to the accompanying drawing which shows a vapor cycle cooling system for an aircraft's air conditioning system according to the invention.

In carrying the invention into effect according to one convenient form, by way of example only, with reference to the single figure of the drawing, I provide in an air conditioning system for aircraft, a vapor cycle cooling system of the closed circuit type using a known refrigerant which is adapted to cool fresh ram air in stages.

The cooling system comprises a variable speed refrigerant compressor 1 of the multi-stage type in communication by way of conduit 2 with a condenser 3. The outlet of the condenser 3 is in communication, by way of conduit 4, with an evaporator 7. An expansion valve 10 is provided in conduit 4 upstream of the inlet to the evaporator 7. The outlet of the condenser 3 is also in communication with an evaporator 15, by way of branch line 16 leading out of conduit 4 downstream of the outlet of the condenser 3. An expansion valve 17 is provided in branch lines 16 upstream of the inlet to the evaporator 15. Each expansion valve 10 and 17 is controlled by temperatures sensed downstream of each evaporator 7 and 15, respectively. The outlet of the evaporator 15 is connected to the inlet of the first stage of the compressor 1, the outlet of the first stage of the compressor 1 and the outlet of the evaporator 7 being connected to the inlet of the second stage of the compressor 1.

The refrigerant compressor 1 of the multi-stage type is driven by turbine 30, which is in turn driven by pressurized air flow passing through ducting 21 from any convenient source. The ducting 21 has a branch line 31 positioned upstream of turbine 30 adapted to return air to ducting 21 downstream of turbine 30. Within branch line 31 is positioned turbine 32, which drives fan 33, adapted to draw air recirculated from the aircraft's enclosure through a conduit which then connects with the ducting 21 for discharge of air into the aircraft's enclosure after passage through evaporator 15. The pressurized fresh air is passed through ram air cooled heat exchanger 40 and into heat exchange contact with a flow of fuel in a fuel cooled heat exchanger 41 before passage through evaporator 7 of the cooling system.

In operation of the invention refrigerant leaves the compressor 1 in a gaseous state at a substantially high temperature and pressure flows to the condenser 3 by way of conduit 2, where heat is removed by the flow of fuel. It should be noted that for the lower ranges of supersonic flight, e.g. approximately Mach 1.5, ram air could be used as a condensing medium, but, as the speed is increased, the ram air temperature rises and use of ram air as a condensing medium becomes unsuitable. Therefore, in general, and more particularly for the higher ranges of supersonic flight e.g. Mach 2.2, a flow of fuel is the preferred condensing medium. The refrigerant leaves the condenser in a liquid state by way of conduit 4 and branch line 16 where it passes to expansion valves 10 and 17, being there expanded to a wet vapor at substantially low temperature and pressure. The refrigerant is then returned to compressor 1 after passage through evaporators 7 and 15. Fresh air is thereby cooled by passage over the ram air cooled heat exchanger 40, fuel cooled heat exchanger 41, evaporator 7, and expansion turbine 30 or turbine 32, and discharged into the aircraft's enclosure with recirculated air. The recirculated air, cooled by passage over the evaporator 15, may be further cooled by admixture with the flow of fresh air, if the flow of fresh air is already cooled to a lower temperature than the recirculated air.

The cooling in the evaporators is carried out at separate levels of temperature and pressure, according to the stage of the compressor with which each evaporator is in communication.

The expansion valves are controlled by temperatures sensed downstream of each evaporator, thereby operating each expansion valve to control refrigerant flowing therethrough, thereby further varying the cooling of the evaporators according to the temperatures at the evaporator outlets.

I claim as my invention:

1. In an aircraft of the high speed, high altitude type, a closed circuit vapor cycle system for cooling an enclosure thereof, comprising: a refrigerant compressor of the multi-stage type; a condenser connected to the outlet of said refrigerant compressor; first and second evaporator means connected in parallel to the outlet of said condenser; expansion valve means interposed between the outlet of said condenser and the inlets of said first and second evaporator means; means for passing pressurized fresh air over said first evaporator means to be cooled thereby; a first turbine operatively connected to drive said refrigerant compressor; means for passing said pressurized fresh air from said first evaporator to said first turbine for driving said first turbine, and means for passing said fresh air from said first turbine to the aircraft enclosure; fan means for recirculating air from said enclosure over said second evaporator means and back to said enclosure; a second turbine for driving said fan means, and means for passing a portion of said pressurized fresh air through said second turbine for driving said second turbine; the refrigerant outlet of said second evaporator means being connected to the inlet of the first stage of said compressor, and the refrigerant outlet of said first evaporator means being connected to the inlet of a subsequent stage of said compressor, whereby the pressure and temperature level at which said first and second evaporator means operate are automatically determined.

2. A closed circuit vapor cycle system as recited in claim 1 wherein aircraft fuel is utilized as the condensing medium for said condenser.

3. In an aircraft of the high speed, high altitude type, a closed circuit vapor cycle system for cooling an enclosure thereof, comprising: a refrigerant compressor of the multi-stage type; a refrigerant condenser having its inlet connected to the outlet of said refrigerant compressor; first and second evaporator means having their inlets connected in parallel to the outlet of said condenser; expansion valve means interposed between the outlet of said condenser and the inlets of said first and second evaporator means; a first turbine operatively connected to drive said compressor; means for passing pressurized fresh air over said first evaporator means to be cooled thereby; means for passing said pressurized fresh air from the outlet of said first evaporator means through the first turbine for driving said first turbine; means for passing said fresh air from the outlet of said first turbine to the aircraft enclosure; fan means for recirculating air from said enclosure through said second evaporator means and back to said enclosure; a second turbine for driving said fan means; means for passing a portion of said pressurized fresh air through said second turbine for driving said second turbine; the refrigerant outlet of said said second evaporator means being connected to the inlet of the first stage of said refrigerant compressor, and the refrigerant outlet of said first evaporator means being connected to the inlet of a subsequent stage of said refrigerant compressor; said expansion valve means being provided with temperature sensing means adapted to sense temperature downstream of each evaporator means, thereby controlling the flow of refrigerant therethrough, thus varying the cooling of said evaporator means.

4. In an aircraft of the high speed, high altitude type, a closed circuit vapor cycle system for cooling an enclosure thereof, comprising; a refrigerant compressor of the multi-stage type; a condenser having its inlet connected to the outlet of said refrigerant compressor; first and second evaporator means having their refrigerant inlets connected in parallel to the outlet of said condenser; expansion valve means interposed between the outlet of said condenser and the inlets of said first and second evaporator means; a first turbine operatively connected to drive said refrigerant compressor; means for passing pressurized fresh air over said first evaporator means to be cooled thereby and through said first turbine for driving said first turbine; the outlet of said first turbine being connected to the aircraft enclosure; fan means for recirculating air from said enclosure, over said second evaporator means, and back to said enclosure; a second turbine for driving said fan means; means for passing a portion of said pressurized fresh air through said second turbine for driving said second turbine; the refrigerant outlet of said second evaporator means being connected to the inlet of the first stage of said compressor, and the refrigerant outlet of said first evaporator means being connected to the inlet of a subsequent stage of said compressor, whereby the pressure and temperature levels at which said first and second evaporator means operate are automatically determined; and heat exchange means for cooling said pressurized fresh air prior to passage over said first evaporator means.

5. A closed circuit vapor cycle system as set forth in claim 4, wherein said heat exchange means comprises a fuel cooled heat exchanger and an air cooled heat exchanger.

References Cited in the file of this patent

UNITED STATES PATENTS

| | | |
|---|---|---|
| 2,127,991 | Candor | Aug. 23, 1938 |
| 2,473,496 | Mayer | June 14, 1949 |
| 2,787,889 | Swank | Apr. 9, 1957 |
| 2,932,176 | Farkas | Apr. 12, 1960 |
| 2,941,372 | Taylor | June 21, 1960 |
| 2,941,373 | Simmons | June 21, 1960 |
| 2,947,154 | Chausson | Aug. 2, 1960 |
| 2,963,879 | Paravicini | Dec. 13, 1960 |